(12) United States Patent
Schoepf et al.

(10) Patent No.: US 7,982,157 B2
(45) Date of Patent: Jul. 19, 2011

(54) METHOD FOR MACHINING A WORKPIECE

(75) Inventors: Martin Schoepf, Stuttgart (DE); Bernd Schaefer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 729 days.

(21) Appl. No.: 11/793,122

(22) PCT Filed: Oct. 13, 2005

(86) PCT No.: PCT/EP2005/055233
§ 371 (c)(1),
(2), (4) Date: Jun. 12, 2007

(87) PCT Pub. No.: WO2006/063882
PCT Pub. Date: Jun. 22, 2006

(65) Prior Publication Data
US 2009/0120912 A1 May 14, 2009

(30) Foreign Application Priority Data

Dec. 15, 2004 (DE) .......... 10 2004 060 290

(51) Int. Cl.
*B23H 7/26* (2006.01)
*B23H 7/10* (2006.01)
*B23H 7/28* (2006.01)
*B23H 7/38* (2006.01)

(52) U.S. Cl. .......... 219/69.17; 219/69.12; 219/69.2

(58) Field of Classification Search ........ 219/69.12, 219/69.17, 69.16, 69.2; 204/222, 223, 224 M; 205/654, 665
See application file for complete search history.

(56) References Cited

U.S. PATENT DOCUMENTS

| | | | | |
|---|---|---|---|---|
| 3,529,124 A | * | 9/1970 | Keating et al. | 219/124.03 |
| 4,104,502 A | * | 8/1978 | Ullmann et al. | 219/69.12 |
| 4,349,716 A | * | 9/1982 | Di Piazza | 219/69.15 |
| 4,379,960 A | * | 4/1983 | Inoue | 219/69.17 |
| 4,436,976 A | * | 3/1984 | Inoue | 219/69.2 |
| 5,086,203 A | * | 2/1992 | Kobayashi et al. | 219/69.12 |
| 5,354,963 A | * | 10/1994 | Muller et al. | 219/121.54 |
| 5,417,833 A | * | 5/1995 | Harra et al. | 204/298.2 |
| 5,753,882 A | * | 5/1998 | Goto et al. | 219/69.18 |
| 6,127,642 A | * | 10/2000 | Gleason et al. | 219/69.15 |
| 6,585,462 B1 | * | 7/2003 | Goransson | 409/231 |
| 7,594,987 B2 | * | 9/2009 | Lukic | 204/224 M |
| 2004/0199074 A1 | * | 10/2004 | Ritter et al. | 600/424 |

FOREIGN PATENT DOCUMENTS

| | | | |
|---|---|---|---|
| CH | 661463 A5 | * | 7/1987 |
| JP | 55 112726 | | 8/1980 |
| JP | 60-67031 A | * | 4/1985 |
| JP | 62-208830 A | * | 9/1987 |
| JP | 63-2611 A | * | 1/1988 |
| JP | 1-97525 A | * | 4/1989 |
| JP | 4-201122 A | * | 7/1992 |
| JP | 10-128620 A | * | 5/1998 |
| JP | 2002/154013 | | 5/2002 |
| JP | 2003-117734 A | * | 4/2003 |
| WO | WO 03/041900 | | 5/2003 |

OTHER PUBLICATIONS

Machine translation of Japan Patent No. 2003-117,734, May 2010.*
Machien translation of Japan Patent No. 10-128,620, May 2010.*

\* cited by examiner

*Primary Examiner* — Geoffrey S Evans
(74) *Attorney, Agent, or Firm* — Kenyon & Kenyon LLP

(57) ABSTRACT

A method for machining a workpiece which includes a conductor which carries a time-variable current along its longitudinal axis and is guided by an upper guide and a lower guide. A magnetic field is produced between the guides, the upper guide being located at a distance above the magnetic field and the lower guide at a distance below the magnetic field.

13 Claims, 2 Drawing Sheets

METHOD FOR MACHINING A WORKPIECE

FIELD OF THE INVENTION

The present invention relates to a method for machining a workpiece and a device for machining a workpiece.

BACKGROUND INFORMATION

An electrical discharge machining process (EDM) makes it possible to remove material from a workpiece and thus drill a hole in such workpiece. In such electroerosive machining of the workpiece, an electrical field is applied between an electrode and a machining location of the workpiece; in addition, a suitable machining fluid is supplied to this machining location.

In International Patent Application WO 03/041900 A2, an EDM method including magnetic gap regulation is discussed. In this method, a stationary magnetic field regulates a distance between the electrode and the machining location of the workpiece. The electrode is designed as a current-carrying conductor and is situated within the magnetic field. Due to a Lorentz force induced by the magnetic field and acting on the conductor, this conductor is deflected within a vertically positioned sleeve guide so that it performs an axial movement. This produces an optimal distance between the electrode and the workpiece as a function of the flowing current. The greater this current, the greater is the Lorentz force acting upon the conductor and an associated deflection. The distance of one end of the conductor from the workpiece is thus in direct proportion to the current flowing through the conductor.

SUMMARY OF THE INVENTION

In the method according to the present invention for machining a workpiece, a conductor carries a time-variable current along its longitudinal axis and is guided by an upper guide and a lower guide. A magnetic field is produced between the upper guide and the lower guide, the upper guide being located at a distance $y(o)$ above the magnetic field and the lower guide being located at a distance $y(u)$ below the magnetic field. Due to the magnetic field acting on the current within the conductor, a Lorentz force acts on this conductor, which excites the conductor to perform an at least one-dimensional movement or oscillation.

A magnetic field which rotates, for example, may cause the current-carrying conductor to perform an elliptical or circular movement. Such a rotating magnetic field may be produced by at least one permanent magnet rotating around the conductor or by a number of electromagnets positioned perpendicular to the conductor, current being supplied to the electromagnets in a suitable manner.

If the method is implemented at a constant angular speed, for example, the magnetic field may be rotated at least once by 360° or by a suitable multiple of 360°. This makes it possible in the case of electroerosive machining of a metallic workpiece to drill cylindrically symmetric holes in this workpiece, outlet openings of such holes being of a circular shape and having larger radii than circular inlet openings of these holes.

It is also conceivable to rotate a stationary magnetic field step-wise between individual positions. In doing so, the conductor is first excited to oscillations in a first direction, an elliptical hole being bored into the workpiece, the large semi-axis of which is aligned with this first direction. After that, the stationary magnetic field is rotated so that the conductor oscillates in a second direction. This procedure may be continued at additional orientations of the stationary magnetic field at various angles. Accordingly, a superposition of two or more elliptical holes is produced or a hole is produced having a plurality of arcs circumferentially offset at angles.

The area of the conductor which is guided between the upper and lower guide and is located within the magnetic field, a longitudinal axis of the conductor being largely aligned perpendicular to the magnetic field, is excited to movement by Lorentz forces as a product of an interaction of the current flowing through the conductor and the magnetic field. Guiding the conductor between the upper and the lower guide causes the end of the conductor facing a machining location of the workpiece and located below the lower guide to move or oscillate. A suitable selection of one position each of the lower and the upper guide makes it possible to set an amplitude of the movement of the conductor between the two guides and accordingly an amplitude of the movement of the end of the conductor as well, thus regulating a size of the machining location on the workpiece qualitatively and/or quantitatively. In implementing the method, the positions of the two guides and accordingly distances $y(o)$ and $y(u)$ may be varied.

The current flowing in the conductor causes an electrical field to be present between the end of the conductor and a machining location of the workpiece. In addition, a machining fluid, for example a dielectric, is supplied to the machining location. In such an electrical discharge machining (EDM) method, material is removed from the workpiece in the machining location. The workpiece may thus be electroerosively machined for drilling holes, for example.

Using the conventional EDM method, it is only possible to produce conical microholes on a limited basis. It is presently possible to reproducibly produce conicities up to approximately 15 μm in mass production corresponding to the absolute value of a difference of an outlet diameter less an inlet diameter of the drilled hole for a length of 1 mm of the drilled hole, corresponding to a k-factor of 1.5. If, however, functional requirements specify conicities having a k-factor greater than 1.5, for example, for holes of injection nozzles, it is possible to produce such holes by laser drilling, for example. However, the process stability and hole quality in laser drilling are not generally satisfactory.

The present method now makes it possible to produce holes having very high conicities. Such holes may have a k-factor of up to 10.0.

In this method, the conductor assumes the function of an electrode for the electroerosive treatment of the workpiece. The conductor may be in the form of a wire and be longitudinally aligned with the machining location of the workpiece. The end of the conductor may assume a largely right angle in relation to the surface of the workpiece; however, the end of the conductor may also be at an incline to the surface of the workpiece if necessary.

The present method has the advantage that an oscillation or deflection of the conductor, in particular the end of the conductor facing the machining location of the workpiece, may be implemented without an additional mechanical arrangement directly impinging on the conductor. It is thus possible to influence movements of the conductor rapidly and flexibly in a simple manner without being limited by the inertia of such a mechanical arrangement. In this connection, the conductor may be set in motion at comparatively high rotational speeds.

In addition, the varying current may be provided in the conductor via a source. This source may generate, via an oscillating circuit, a pulsed current having a variable direction through a parallel positioning of a static pulse generator having capacitors, so that the conductor is already deflected thereby in a static magnetic field.

The device according to the present invention for machining a workpiece includes a conductor, an upper guide and a lower guide through which the conductor is guided and between which there is a magnetic field produced by at least one magnet, the upper guide being positioned at a distance y(o) above the magnetic field and the lower guide being positioned at a distance y(u) below the magnetic field. This device is designed to cause the conductor to move or oscillate and may be installed in a conventional eroding machine or used in such an eroding machine. In the presence of a machining fluid, it is thus possible to produce conical microbores in the workpiece having comparatively high k-factors. It is also conceivable that the present device may be used as an eroding machine through the addition of a suitable feed for the machining fluid.

The device may include, for example, at least one magnet which is rotatable around the conductor. It is possible to use for this purpose any permanent magnets or electromagnets, which move in a suitable manner relative to the conductor or as a result of an adequate current feed in the area of the conductor or produce a magnetic field varying in two spatial directions.

The device may be equipped with a source for providing a time-variable current flowing through the conductor. The source may have a parallel arrangement of a static pulse generator and capacitors and generate a pulsed current via an oscillating circuit.

Additional advantages and embodiments of the invention may be found in the description and the accompanying drawing.

It is understood that the features stated above and the features still to be explained below are usable not only in the particular combination specified but also in other combinations or alone without departing from the framework of the present invention.

DETAILED DESCRIPTION

Figure 1:
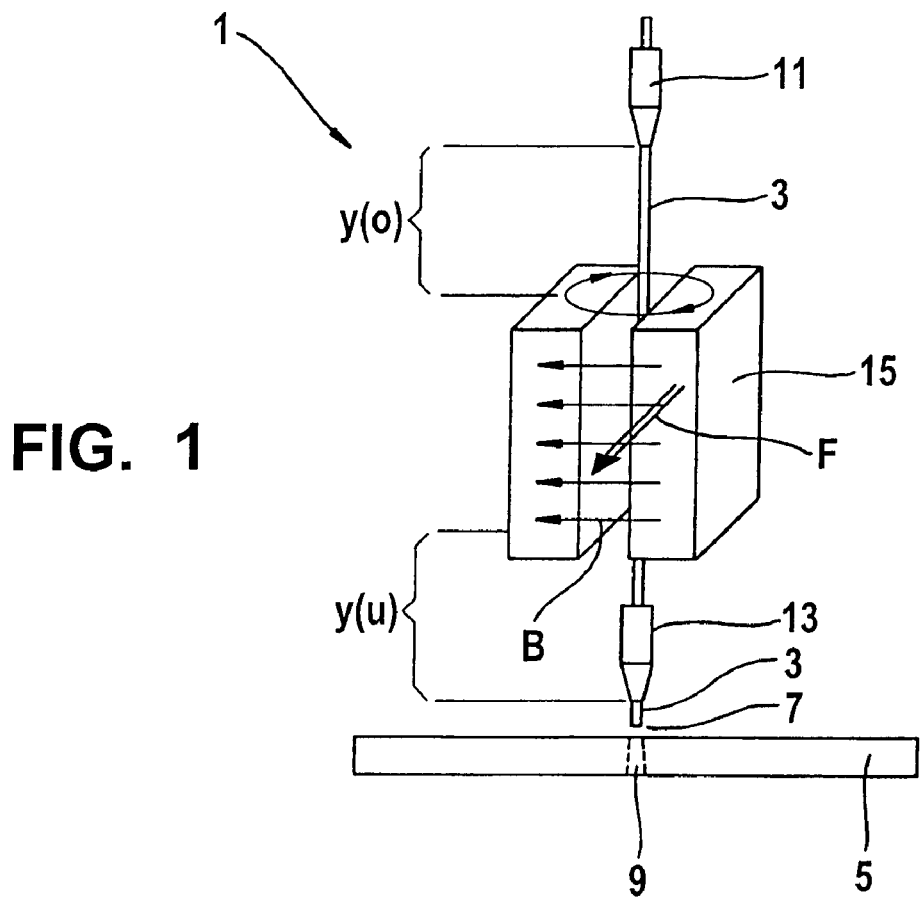
FIG. 1 shows a schematic representation of a first embodiment of a device according to the present invention.

The figures are described interconnectedly and in overlapping fashion. Identical reference characters denote identical components.

Device 1 shown schematically in FIG. 1 has a conductor 3 in the form of a wire, parts of which are shown, the conductor being designed for electroerosive machining of a workpiece 5. In this electroerosive machining or electrical discharge machining (EDM), a time-variable current flows through conductor 3 so that an electrical field is present between one end 7 of conductor 3 and a machining location of workpiece 5. The addition of a suitable machining fluid, for example, a dielectric, makes it possible for material to be removed from workpiece 5 so that a hole 9 is drilled into the workpiece.

Accordingly, conductor 3 is used as an electrode in this method. Furthermore, conductor 3 is guided between an upper guide 11 and a lower guide 13 of device 1. Between these two guides 11, 13 are located two schematically depicted magnets 15 that surround conductor 3. A magnetic field B indicated by the arrows and produced by magnet 15 is aligned perpendicular to a longitudinal axis of conductor 3. When the time-variable current flows through conductor 3, a Lorentz force in the direction of the double arrow is induced on the electrical charge flowing in conductor 3 perpendicular to the magnetic field and perpendicular to a direction in which the charge flows. This causes conductor 3 to be moved or oscillated perpendicular to its longitudinal axis or axially, as a result of which end 7 of conductor 3 is also caused to move or oscillate relative to workpiece 5.

If magnetic field B is changed in two spatial directions perpendicular to the longitudinal axis of conductor 3, conductor 3 is caused to move axially, end 7 of conductor 3 also being caused to move or being induced to oscillate two-dimensionally relative to workpiece 5.

In the present example, this is accomplished by having magnets 15 rotate around conductor 3. With a considerable reduction of the process time, this device 1 may be used to drill a conical hole 9 of high quality having a comparatively high k-factor into workpiece 5. The movements of conductor 3 are produced without high-inertia or a delicate mechanical arrangement.

Magnetic field B is installed between upper guide 11 and lower guide 13. In addition to the electromagnetic parameters, i.e., in addition to a strength of magnetic field B, its direction and its change over time in two orientations in space as well as a suitable change over time of the current flowing through conductor 3, an upper distance y(o) between upper guide 11 and magnetic field B and a lower distance y(u) between magnetic field B and lower guide 13 are of significance. The distance of the two guides 11, 13 influences a deflection or amplitude of the section of conductor 3 located between these guides 11, 13 as well as an amplitude of the also moving end 7 of conductor 3. These two distances y(o) and y(u) may also vary due to a change in the position of the two guides 11, 13. It is thus possible to influence the stimulation of oscillations or a translatory motion of end 7 of conductor 3 of the machining location of workpiece 5, at which hole 9 is produced.

Figure 2:
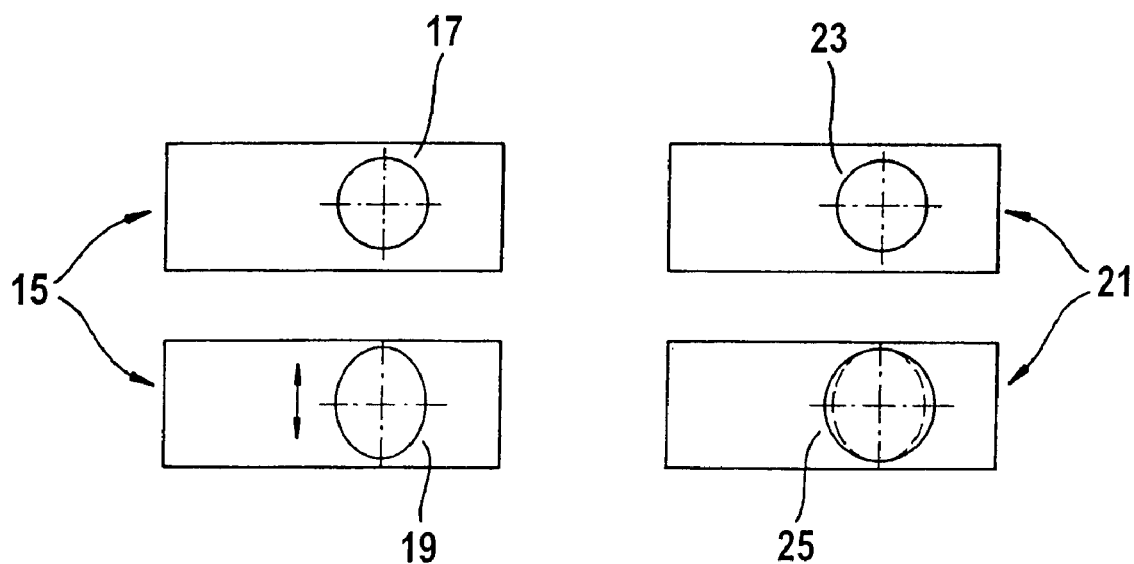
FIG. 2 shows first exemplary embodiments of inlet and outlet openings of drilled holes in schematic representation.

In a schematic representation, FIG. 2 shows, at upper left, an inlet opening 17 and, at lower left, an outlet opening 19 of a drilled hole in a workpiece 15, which was machined using an EDM method using a device 1 as shown in FIG. 1 having a spatially unchanged magnetic field and having a time-variable current in conductor 3. Workpiece 21 depicted at the right was machined using an EDM method in which an electrode or a conductor was deflected in two spatial directions by a device 1 as presented in FIG. 1 by a magnetic field which varies in two spatial directions. To this end, an inlet opening 23 is shown at the upper right and an outlet opening 25 of a hole drilled in this workpiece 21 is shown at the lower right.

Inlet opening 17 of the drilled hole of workpiece 15 shown on the left is round, while outlet opening 19 is oval in form. This was accomplished by conducting a time-variable current through conductor 3 or the electrode in the presence of a static magnetic field so that one end of the conductor performed an oscillation or movement in the direction of the double arrow due to a Lorentz force resulting from the static magnetic field.

In second workpiece 21 in the case of which conductor 3 was additionally exposed to a rotating magnetic field to produce the drilled hole located in it, both inlet opening 23 and outlet opening 25 are round, outlet opening 25 having a larger diameter than inlet opening 23. This was accomplished in that in addition to a suitable geometrical and magnetic design of device 1, the magnetic field was rotated in such a manner that the Lorentz force resulting from it and acting on the electrode was rotated 360°. The constantly changing orientation of the Lorentz force or of an associated deflection force acting on conductor 3, which was produced by the spatially changing magnetic field, makes it possible to produce from an oval form of outlet opening 19 of workpiece 15 on the left a circular outlet opening 25 of the hole in workpiece 21 on the right having a large conicity.

In addition to a process engineering design of device 1, i.e., the circumstance that the current through conductor 3 varies over time and the magnetic field moves in two spatial directions perpendicular to conductor 3 if necessary, a stimulation of oscillations of end 7 of conductor 3 is regulated via distances y(o) and y(u). A suitable selection of these distances y(o) and y(u) makes it possible to quantitatively influence sizes of the holes to be drilled in the workpiece. It is possible to set dimensions for major and minor semiaxes in elliptical openings or radii for circular openings for both inlet openings and outlet openings. In implementing the method, magnets 15 may perform rotations at any rotational speed.

Figure 3:
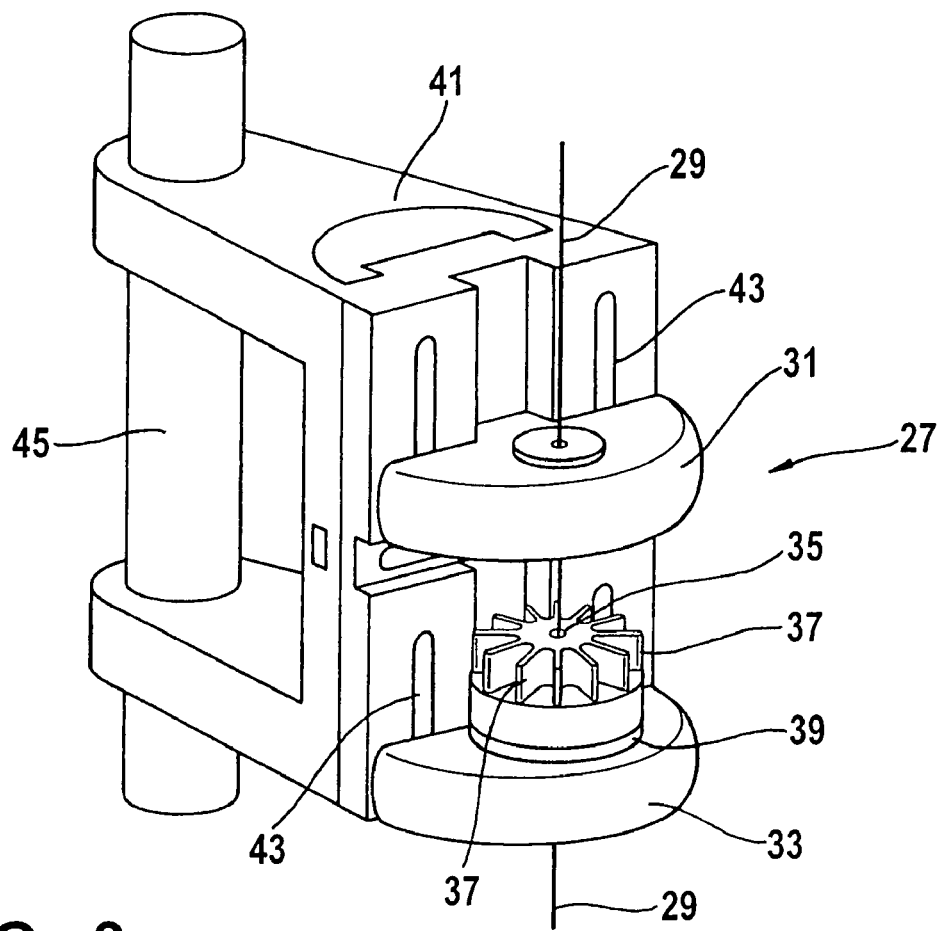
FIG. 3 shows a schematic representation of a technical implementation of a device according to the present invention.

FIG. 3 shows a schematic representation of another device 27 for implementing the method or for technically implementing the device shown in FIG. 1. An electrode 29 in the form of a wire, only parts of which are shown in FIG. 3, is guided between an upper guide 31 and a lower guide 33. Furthermore, electrode 29 is guided through an opening 35 which is surrounded by a plurality of magnets which are not shown in greater detail. In addition, blades 37 of an air turbine designed for driving a rotor 39 are situated rotatably around opening 35.

The two guides 31, 33 are slidably fastened to a mounting device 41. It is possible to move guides 31, 33 along rails 43. Mounting device 41 is fastened to a bar 45. Device 27 shown here may be installed in any conventional eroding machine and operated in such a way that, due to a rotation of blades 37, one end of electrode 29 facing the workpiece not shown in FIG. 3 performs a rotational movement relative to this workpiece and drills a conical hole into the workpiece in the presence of a machining fluid, a current flowing through electrode 29 being designed as a conductor in the form of a wire.

Figure 4:
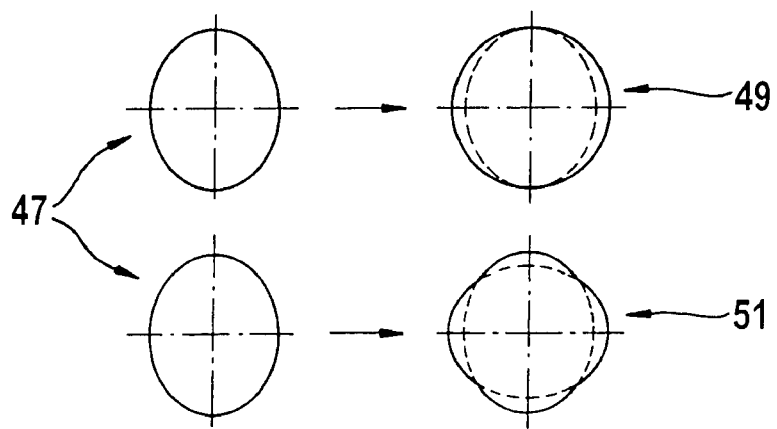
FIG. 4 shows additional examples of inlet and outlet openings of holes in schematic representation.

FIG. 4 shows additional forms for outlet openings 47, 49, 51 of holes which may be produced by an erosive metal machining method using one of devices 1 or 27 from FIG. 1 or 3, respectively.

On the left are shown outlet openings 47 which were produced through the influence of a stationary magnetic field and a variable current within the conductor and have a largely oval or elliptical cross section.

Increasing a distance between the lower guide in which the conductor is guided and the workpiece makes it possible to produce oval outlet openings 47 corresponding to the Lorentz forces acting in the magnetic field on one outlet side as well. To this end, it is only necessary to continuously reduce distance y(o) of the lower guide in relation to a depth of the hole. A conicity of the hole is directly proportional to the deflection force in the magnetic field and a depth of the hole.

A combination of a translatory movement of the upper guide and a rotational movement of the magnetic field makes additional hole forms possible with respect to conicity, cylindricity and the like.

In this connection, in FIG. 4, outlet opening 49 depicted at the upper right is produced by rotating the magnetic field from outlet opening 47 at upper left drilled under a stationary magnetic field. Outlet opening 51 depicted at lower right is produced starting from outlet opening 47 at the lower left by rotating the magnetic field in 90° steps. This outlet opening 51 was drilled in two phases, the end of the conductor performing oscillations in two directions rotated 90° at the same amplitude in each case.

The present method or the present device makes it possible to machine holes for injection systems such as, e.g., for nozzles of diesel fuel injection systems or of injection orifice disks for injection valves.

What is claimed is:

1. A method for machining a workpiece, the method comprising:
   guiding a conductor, which carries a time-variable current along its longitudinal axis, by an upper guide and a lower guide, a magnetic field being produced by an external source and applied to the conductor between the guides; and
   locating the upper guide at a first distance above the magnetic field and the lower guide at a second distance below the magnetic field;
   wherein the magnetic field causes a lateral movement of the conductor between the guides and a corresponding lateral movement of an end of the conductor; and
   wherein the magnetic field is rotated.

2. The method of claim 1, wherein a selection of at least one of the first distance and the second distance causes an amplitude of a movement of an end of the conductor to be regulated.

3. The method of claim 1, wherein at least one of the first distance and the second distance is changed.

4. The method of claim 1, wherein an electrical field is present between an end of the conductor and a machining location of the workpiece, and material is removed from the workpiece at the machining location in the presence of a machining fluid.

5. The method of claim 1, wherein a pulsed current is passed through the conductor.

6. The method of claim 1, wherein a direction of the current is changed.

7. The method of claim 1, wherein the rotation of the magnetic field changes a direction of the lateral movement of the conductor between the guides and the corresponding lateral movement of the end of the conductor.

8. The method of claim 7, wherein a plurality of hole shapes are produced in the workpiece via the changing of the direction of the corresponding lateral movement of the end of the conductor in accordance with the rotation of the magnetic field.

9. A device for machining a workpiece comprising:
   a guiding arrangement for guiding a conductor, which carries a time-variable current along its longitudinal axis, by an upper guide and a lower guide, a magnetic field being produced by an external source, which includes at least one rotatable magnet., and applied to the conductor between the guides; and
   a positioning arrangement for positioning the upper guide at a first distance above the magnetic field and the lower guide at a second distance below the magnetic field;
   wherein the magnetic field produced by the external source causes a lateral movement of the conductor between the guides and a corresponding lateral movement of an end of the conductor.

10. The device of claim 9, wherein at least one of the two guides is movable.

11. The device of claim 9, wherein a source produces a time-variable current flowing through the conductor.

12. The device of claim 9, wherein rotation of the magnetic field produced by the external source changes .a direction of the lateral movement of the conductor between the guides and the corresponding lateral movement of the end of the conductor.

13. The device of claim 12, wherein a plurality of hole shapes are produced in the workpiece via the changing of the direction of the corresponding lateral movement of the end of the conductor in accordance with the rotation of the magnetic field produced by the external source.

* * * * *